C. E. SEARCH.
TRACTOR.
APPLICATION FILED DEC. 9, 1915.
1,241,034.
Patented Sept. 25, 1917.
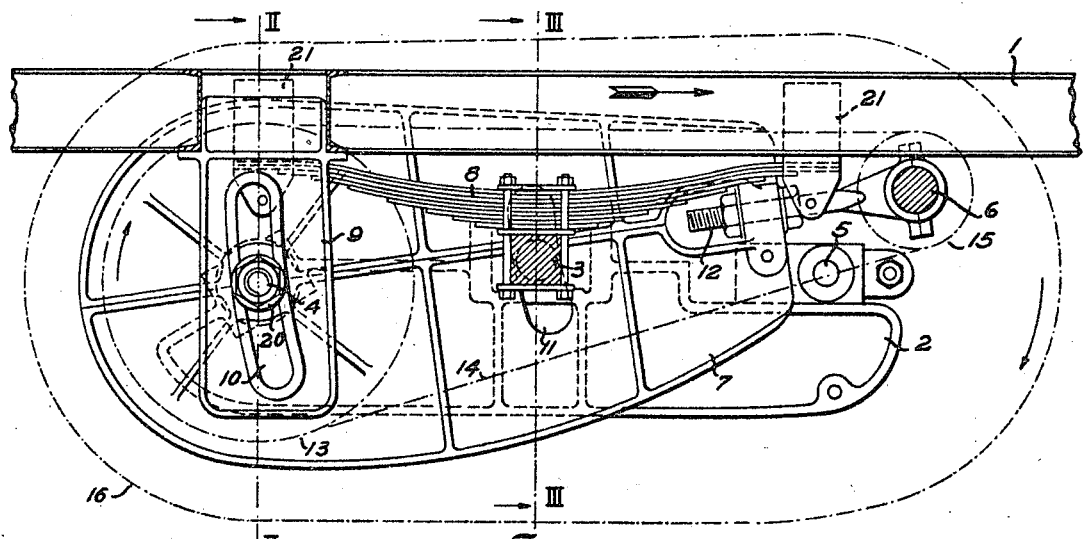
Fig. 1
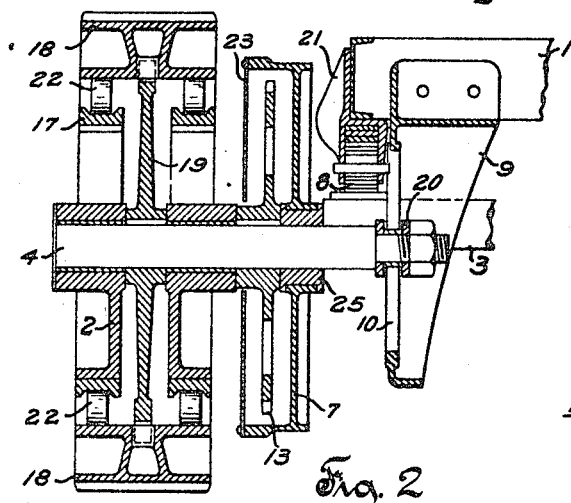
Fig. 2
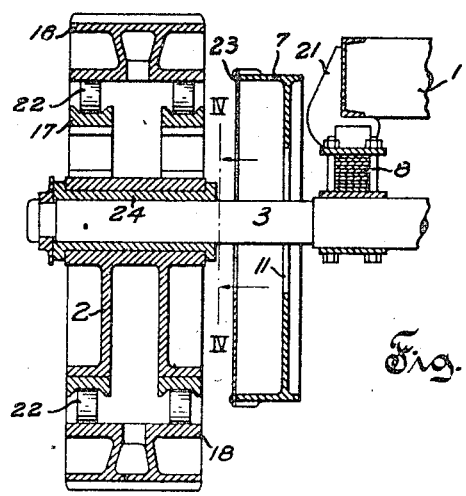
Fig. 3
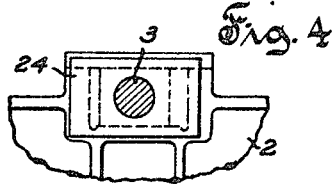
Fig. 4
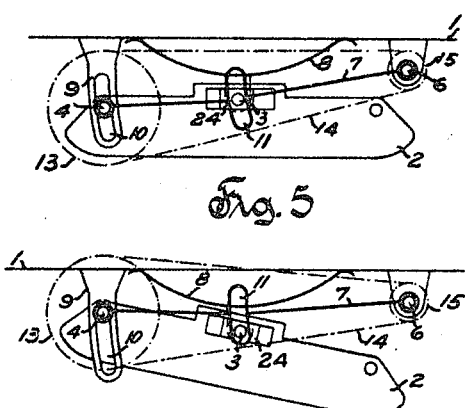
Fig. 5
Fig. 6
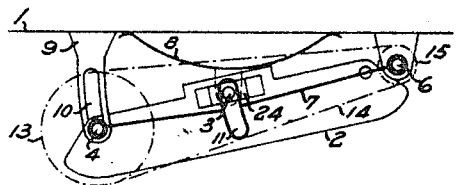
Fig. 7
Inventor
C. E. Search
by
Attorney

UNITED STATES PATENT OFFICE.

CHARLES EDWIN SEARCH, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

TRACTOR.

1,241,034.

Specification of Letters Patent.  Patented Sept. 25, 1917.

Application filed December 9, 1915.  Serial No. 66,396.

*To all whom it may concern:*

Be it known that I, CHARLES EDWIN SEARCH, a citizen of the United States, residing at Milwaukee, in the county of Milwaukee and State of Wisconsin, have invented a certain new and useful Improvement in Tractors, of which the following is a specification.

This invention relates to improvements in the construction of tractors and particularly to means for movably restraining the track frames of endless track mechanisms by the vehicle frame.

An object of the invention is to provide a tractor of the endless track type, which is simple and rugged in construction and efficient in operation. One of the more specific objects is to provide means for movably restraining each of the track frames of an endless track vehicle at at least two places in order to positively prevent movement or displacement of the track frames out of their planes of motion about the vehicle axle. Another object is to provide a mounting for each track driving mechanism on its track frame, at a place remote from the axle of the vehicle, the track frame being guided at said place directly upon the vehicle frame. Still another object is to provide devices for adjusting the positions of the track frames relative to the vehicle frame.

A clear conception of an embodiment of the invention may be had by referring to the drawing accompanying and forming a part of this specification, in which like reference characters designate the same or similar parts in the various views.

Figure 1 is a transverse vertical section through a fragment of a vehicle frame looking toward one of the endless track mechanisms thereof, part of the disclosure being diagrammatic.

Fig. 2 is a vertical section through a fragment of a vehicle frame and one of the endless track mechanisms thereof, the section being taken along the line II—II of Fig. 1 looking in the direction of the arrows.

Fig. 3 is a vertical section through a fragment of a vehicle frame and one of the endless track mechanisms thereof, the section being taken along the line III—III of Fig. 1 looking in the direction of the arrows.

Fig. 4 is a section through the vehicle axle showing the support for the same in one of the track frames, the section being taken along the line IV—IV of Fig. 3 looking in the direction of the arrows.

Figs. 5, 6 and 7 are diagrammatic views showing various positions of a track frame and track driving mechanism, relative to the vehicle frame.

The track frames 2 form supports for the projecting ends of the axle 3, which axle in turn forms a support for the rear of the vehicle frame 1 through the leaf springs 8 and the spring connections 21, see Fig. 1. The track frames 2 are connected to the ends of the axle 3 by means of crosshead blocks 24 which are swiveled upon the axle and slidably engage surfaces of the frames 2, see Figs. 3 and 4.

Each of the track frames 2 has mounted in the trailing end thereof, a track driving shaft 4, upon which is mounted the track driving sprocket 19, see Figs. 1 and 2. The track driving sprockets 19 drivingly engage the links 18 of the endless driving track 16. An idler sprocket shaft 5 is mounted in bearings at the leading end of each of the track frames 2 and forms a mounting for an idler sprocket which also engages the links 18 of the endless track 16. Rollways 17 mounted upon the track frames 2 form bearing surfaces for the rollers 22 which support the links 18 of the endless track 16.

Mounted upon each of the track driving shafts 4 between the track frame 2 and the vehicle frame 1, is a driving sprocket 13. Motion is transmitted to the driving sprockets 13 by means of chains 14 and sprockets 15. The sprockets 15 are fixed to the power shaft 6 which is mounted in bearings secured to the vehicle frame 1 in the usual manner. In order to maintain constant the distances between the track driving shafts 4 and the power shaft 6, links 7 which have ends bearing upon the shafts 4 and the power shaft 6, respectively, are provided. Each of the links 7 comprises a rear portion which forms a housing for the adjacent driving chain 14, and a front end portion 12 adjustably secured to the housing portion. The housing portion of each of the links 7 is preferably formed of two parts for removal and provided with a bearing bushing 25 which engages the adjacent shaft 4. Plates 23 secured to the housing portions of the links 7 serve to inclose the sprockets 13 and the driving chains 14. The housing portions of the links 7 and the adjacent plates 23 are provided with elongated slots 11 which permit swinging of the links 7 about the power shaft 6 without interference with the axle 3. The inwardly projecting ends of the shafts 4 are provided with blocks 20 which engage guide slots 10 in the brackets 9, see Figs. 1 and 2. The brackets 9 are rigidly secured to the vehicle frame 1 and serve to movably restrain the frames 2 to motion in planes perpendicular to the axes of the axle 3 and shafts 4.

During normal operation of the tractor and for motion of the same in a forward direction, the power shaft 6 is rotated by the engine in a clockwise direction causing the driving sprockets 13 to rotate in a like direction and causing the track sprockets 19 to impart motion to the endless tracks 16 in a clockwise direction. The endless tracks 16 during their movement engage the rollers 22, which in turn engage the rollways 17 on the track frames 2. Motion of the tractor may be reversed by reversing the direction of rotation of the power shaft 6.

In order to maintain driving contact between the tracks 16 and the ground at all times, it is necessary under certain conditions of operation to permit swinging of the track frames 2 about the axle 3, relative to the vehicle frame 1. This relative motion of the frames 1, 2, is illustrated in Figs. 5, 6 and 7, the first of these figures illustrating the normal position with the track frames 2 substantially parallel to the vehicle frame 1, while Figs. 6 and 7 disclose the track frames 2 in their two extreme positions of angularity. As a frame 2 swings about the axle 3, the corresponding track driving shaft 4 will slide relatively to the adjacent vehicle bracket 9. Due to the fixed location of the driving shaft 6 upon the frame 1, the motion of the track driving shaft 4 must be about the shaft 6 as a center. This motion of the shaft 4 about the shaft 6 as a center, causes the track frame 2 to move transversely of the axle 3. In order to permit this relative transverse motion of the axle 3 and the track frame 2, the crosshead block 24 is provided, which is swiveled upon the axle 3 and slides in a guide slot in the track frame 2. In order to permit relative motion of the link 7 and the axle 3, the link is provided with the slot 11 which is of sufficient length to permit motion of the link 7 from one to the other of the extreme positions disclosed in Figs. 6 and 7.

Another variable condition which necessitates provision of the crosshead block 24 or similar device, is the loading of the vehicle. By placing a heavy load upon the vehicle frame 1, and assuming the tracks 16 to be resting upon solid ground at the time, the axle 3 and track frames 2 will remain in relatively fixed positions while the vehicle frame 1 will be moved downwardly due to deflection of the springs 8. This relative motion of the vehicle frame 1 and track frames 2 causes the power shaft 6 to change its position, which in turn causes the shafts 4 to move longitudinally of the vehicle frame 1. Due to this relative displacement of the shafts 4 and frame 1, the track frames 2 will be displaced relatively to the axle 3, thus necessitating the provision of some means, such as the crosshead block 24 and its guide slot in the track frame 2, for permitting relative transverse motion of the track frames 2 and the axle 3.

In order to maintain a proper driving relation between the power shaft 6 and the shafts 4 for chain drives, these shafts should be maintained substantially parallel to each other. As the track driving shafts 4 are located at some distance from the axle 3, there is a tendency, due to the forces applied through the chains 14 in rotating the shafts 4, to cause the trailing ends of the track frames 2 to move out of the planes of motion of these frames about the axle 3. The brackets 9 and blocks 20 coacting with the guide slots 10 of these brackets and with the shafts 4, positively prevent displacement of the track frames 2 out of their planes of motion about the axle 3 and maintain the proper driving relations between the shafts 4 and the power shaft 6. The brackets 9 besides maintaining this proper driving relation between the elements, serve to relieve the axle 3 of strains due to coaction of the end portions of the endless track mechanisms with obstacles. The links 7 which connect the shafts 4 with the power shaft 6, serve to transmit practically the entire tractor driving force from the track frames 2 to the vehicle frame 1. In order to retain the proper relative positions of the track and vehicle frames, the end portions 12 of the links 7 may be adjusted relatively to the housing portions by means of suitable nuts threaded upon the end portions 12 and engaging abutments on the housing portion. The housing portion 7 may also be made in halves as disclosed, in order to permit ready assembling and removal thereof for inspection and repairs.

While the track driving shafts 4 are disclosed as mounted in the trailing ends of the track frames 2, this construction is not essential. The use of a block for permitting relative motion between each of the track frames 2 and the axle 3 is not essential and any other device for permitting relative transverse motion of these parts may be substituted.

It should be understood that it is not desired to be limited to the exact details of construction shown and described, for obvious modifications will occur to a person skilled in the art.

It is claimed and desired to secure by Letters Patent.—

1. In combination, a vehicle frame, a track frame having two connections with said vehicle frame, each permitting relative sliding of said frames, and a link pivoted to each of and connecting said frames.

2. In combination, a vehicle frame, a track frame swingable on different axes relatively to said vehicle frame, a guide on one of said frames and extending in one direction, means on the other of said frames and engaging said guide, a second guide on one of said frames and extending in a direction substantially transverse to said first guide, and means on the other of said frames and engaging said second guide.

3. In combination, a vehicle frame, a track frame having two connections with said vehicle frame, each permitting relative swinging and sliding of said frames, and a link pivoted to each of and connecting said frames.

4. In combination, a vehicle frame having an axle, a track frame slidably connected to said axle, and means engaging said track frame at a place remote from said axle for restraining same against motion out of the plane of motion about said axle.

5. In combination, a vehicle frame, a track frame swingably connected to said vehicle frame at one place and at another place guided on said vehicle frame, and means pivoted to each of and connecting said frames.

6. In combination, a vehicle frame having an axle, a track frame slidably connected to said axle, track driving mechanism mounted upon said track frame, means for guiding said track frame at a place thereon adjacent the driving mechanism thereof, and means for communicating driving motion from said vehicle frame to said driving mechanism.

7. In combination, a vehicle frame, a block swiveled on said vehicle frame, and a track frame at one place slidably engaging said block and at another place guided on said vehicle frame.

8. In combination, a vehicle frame, a block swiveled on said frame, a track frame at one place slidably engaging said block and at another place guided on said vehicle frame, and connecting means pivoted to each of said frames.

9. In combination, a vehicle frame, a block swiveled on said frame, a track frame at one place slidably engaging said block, means for guiding said track frame on said vehicle frame, and connecting means pivoted to each of said frames.

10. In combination, a vehicle frame having an axle, a block swiveled on said axle, a track frame at one place slidably engaging said block, a guide on said vehicle frame engaging said track frame at another place thereon, and a link pivoted to each of said frames.

11. In combination, a vehicle frame having an axle, a block swiveled on said axle, a track frame at one place slidably engaging said block, driving mechanism mounted on said track frame, a guide on said vehicle frame engaging said track frame at a place thereon adjacent said mechanism, a link pivoted to each of said frames, and means for communicating driving motion from said vehicle frame to said driving mechanism.

12. In combination, a vehicle frame having an axle, a block swiveled on said axle, a track frame at one place slidably engaging said block, driving mechanism mounted on said track frame, a guide on said vehicle frame engaging said track frame at a place thereon adjacent said mechanism, and a link pivoted to each of said frames, said link being adjustable in length to vary the position of said track frame relative to said vehicle frame.

In testimony whereof, the signature of the inventor is affixed hereto.

CHARLES EDWIN SEARCH.